May 17, 1966 R. TOUVAY ETAL 3,251,672
APPARATUS FOR PRESS BENDING GLASS
Original Filed Feb. 17, 1958 3 Sheets-Sheet 3

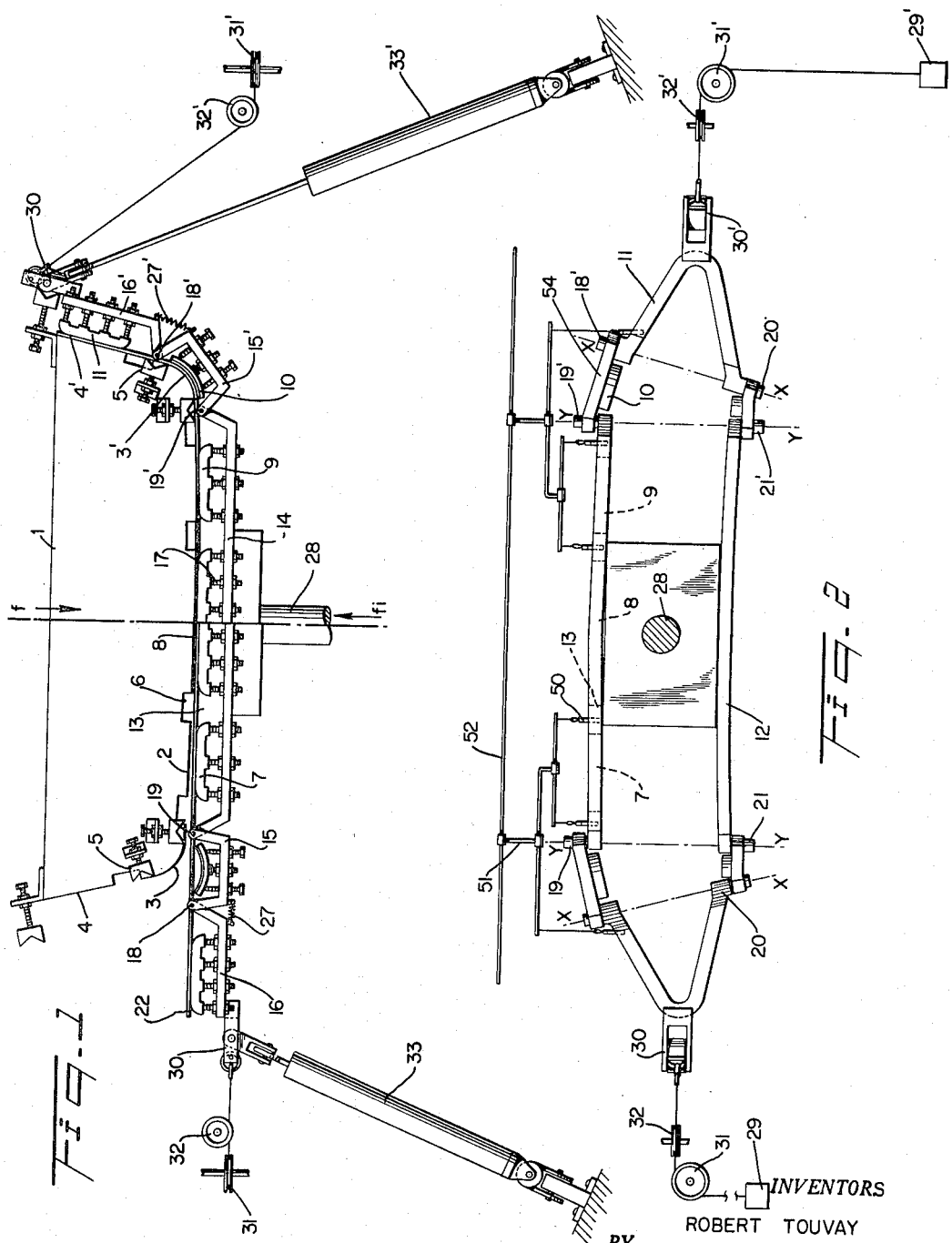

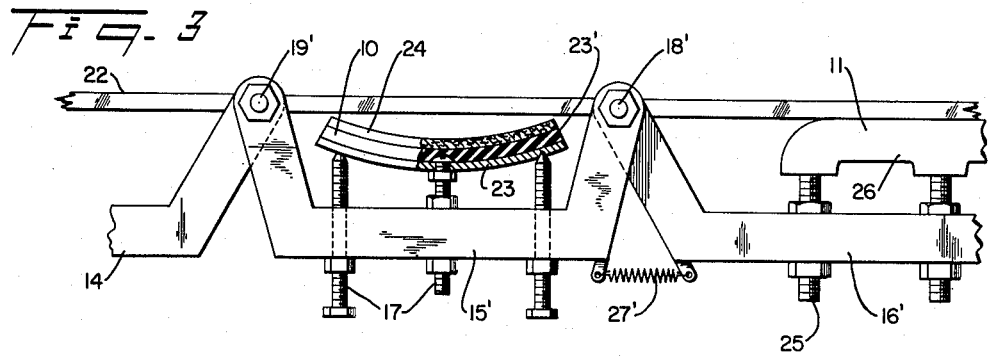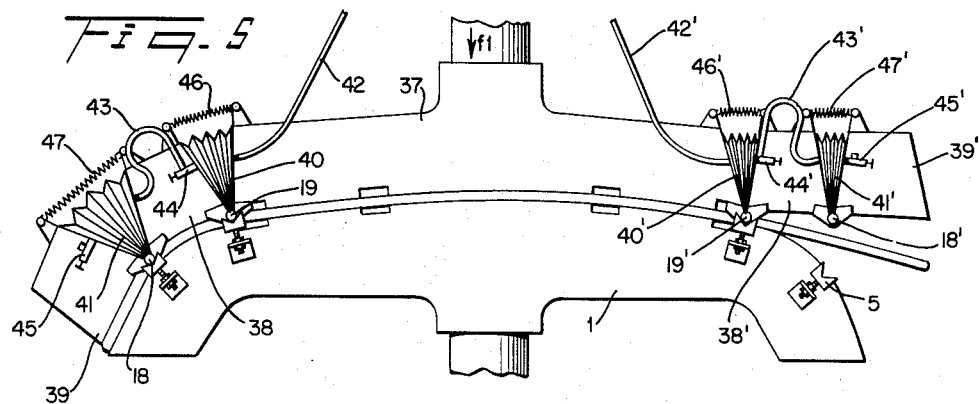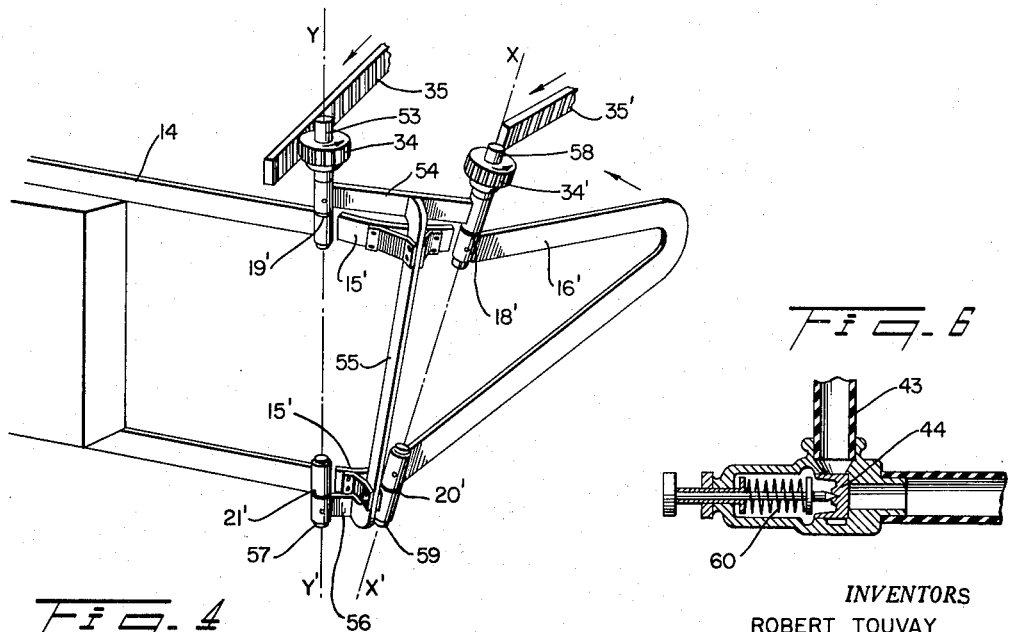

INVENTORS
ROBERT TOUVAY
ROGER EMILE LAMBERT
BY
*Bauer and Seymour*
ATTORNEYS

United States Patent Office 3,251,672
Patented May 17, 1966

3,251,672
APPARATUS FOR PRESS BENDING GLASS
Robert Touvay and Roger Emile Lambert, Paris, France, assignors to Compagnie de Saint-Gobain, Neuilly-sur-Seine, France
Original application Feb. 17, 1958, Ser. No. 715,806. Divided and this application June 4, 1964, Ser. No. 372,542
Claims priority, application France, Feb. 18, 1957, 731,978, Patent 1,168,605
6 Claims. (Cl. 65—291)

This application is a division of patent application Serial No. 715,806, filed February 17, 1958, now abandoned.

This invention relates to the bending of thermoplastic sheets, particularly such as flat glass for use in automobile windshields and glazings, and transparent organic plastics. Inasmuch as the invention is particularly applicable to and has material advantages in connection with the manufacture of automobile windshields and glazings of compound curvature, the invention will be particularly described in connection with that manufacture, but it is to be understood that this particular description does not constitute a limitation.

In recent years automobile windshields have become more complex in form until, at the present time, they frequently involve great manufacturing difficulty. To bend a piece of glass to such complex shapes, without introducing material distortions, is quite difficult.

It is an object of this invention to improve the apparatus for bending thermoplastic sheets to complex shapes and to produce an apparatus of novel and superior design for producing a novel and superior product.

The apparatus of the invention comprises means for pressing sheets of glass and the like along strips at their peripheries between a rigid convex form and a deformable frame which is susceptible of taking the shape of the form and which is composed of a series of sections pivoted to each other and capable of being turned about their points of assembly, the bending being effected in the preferred form of the invention by first pressing the central section of the form, thereafter pressing the adjacent sections of the form, and so on, until finally the terminal elements are applied. In the present description reference will be made to a rigid form having the shape desired in the final article, and to a movable frame having five sections pivoted one to another, but it is to be understood that the principles which are applicable to this particular apparatus are equally applicable to an apparatus having a different number of pivoted sections.

It is a principle of this invention that when it is to be devoted to the bending of sheets which have a series of surfaces of different development, that is to say, which have different geometric forms such as cylindrical, conical and flat, the sections of the frame will pivot around axes which constitute, in effect, the common generatrix of contiguous geometrical shapes.

In a preferred form of the invention the opposed parts of the press are vertically arranged and the sheet of glass is suspended from one end by tongs in a known manner, being thus introduced while vertically suspended between the form and the frame. This method is particularly advantageous using a rigid form and a movable frame in manufacturing automobile windshields of panoramic type which comprise a cylindrical center section of long radius, two adjacent conic sections, and two flat terminal portions.

In the drawings,

FIG. 1 is a schematic plan view of the bending apparatus in operation, half of which shows the apparatus before the bending operation has begun and the other half after the operation has been completed;

FIG. 2 is an elevational view of the articulated frame viewed in the direction of arrow f;

FIG. 3 is a plan view, partly in section, on an enlarged scale, showing the features of construction of the articulated frame;

FIG. 4 is an elevational view of a modified form of the frame;

FIG. 5 is a plan view of a schematic illustration of a modified form of the invention operable by air pressure;

FIG. 6 is a section of a valve illustrated in FIG. 5; and

Figure 7:
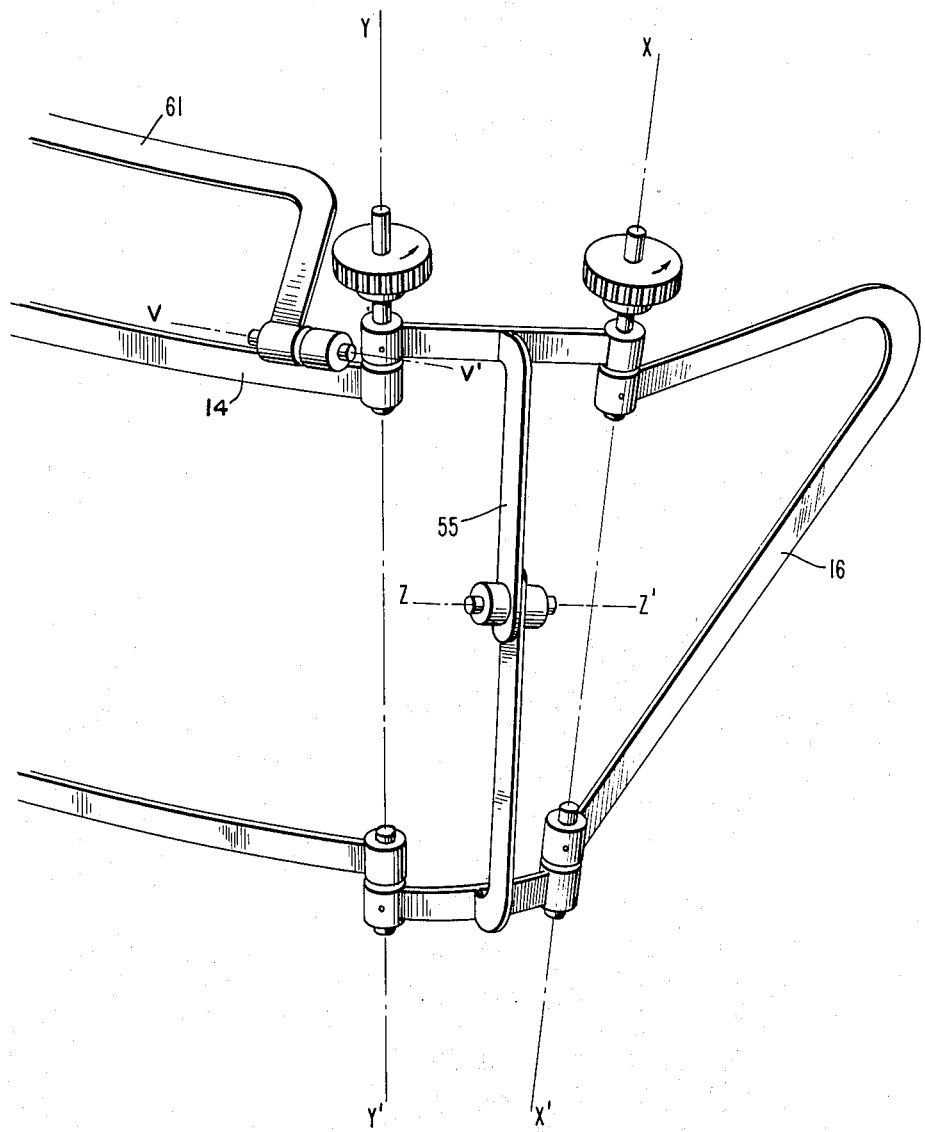
FIG. 7 is an elevational view of a modified form of the frame shown on FIG. 4.

The apparatus includes, in general, a form 1 which is divided into vertical sections having the contour which is desired in the finished article, in the instant example, an automobile windshield. Transportation means 52 is provided, such as a trolley rail or transportation rail, from which the glass is suspended and moved between the form 1 and the frame 8. The suspension of the glass is accomplished by tongs 50 fixed onto carriage 51, moving on rails 52 (FIG. 2). The frame which is used to bend the hot glass against the face of form 1, may be suspended in any desired way, for instance, by being carried on shaft 28. Means are provided to force the frame against the glass and the glass against form 1. These are diagrammatically illustrated in FIG. 1 as composed of a centrally located shaft 28, which operates on the central portion of the frame, and plungers 33, 33' which act on its ends.

In the different structures illustrated in the drawings, the rigid convex form 1 is the same, whereas several modifications of the frame may be used. The sections of the frame are articulated to each other on axes X—X', Y—Y' (FIGS. 2 and 4) which have a particular significance. These axes are aligned with or very close to the plane of the glass 22, and they coincide with a common generatrix between two sections of different curvature. For example, in FIG. 4 the section between axes Y—Y' may be presumed to be a section of a cylinder of long radius, the sections between axes Y—Y' and X—X' may be presumed to be conic sections, and the sections of the frame outside of axes X—X' may be presumed to be flat. There is thus produced an automobile windshield having a cylindrical section, a conic section having a common generatrix therewith, and a flat terminal section having a generatrix common to the conic section. This construction is highly advantageous and overcomes many of the difficulties which have heretofore existed in windshields of differential curvature. The face of the form 1 may advantageously be similarly constructed, the axes X—X' and Y—Y' being disposed so that they pass through the thickness of the glass sheet during pressing, eliminating the danger of ripple formation.

The different forms of the invention differ notably in the ways in which the elements of the frame press the glass against the form.

The form 1 is constructed of appropriate material, for example, sheet steel, and conforms to the shape desired in the final object. The pressing face of the form may be covered with material such as fiber glass, if desired, in order to assure its protection and to prevent the adherence of hot glass to it during pressing. Form 1 includes adjustable abutments 5 which limit the motion of the joints of articulation of the frame. It also includes indentations 6 which receive the tongs used for the suspension of the glass sheet.

Looking now at the form of the invention shown in FIGS. 1 and 2, the sheet of glass 22 is suspended between the form 1 and the frame. The frame is composed of strong beams 16, 15, 14, 15', 16' which have offset ends, better seen in FIG. 3, which are articulated in the plane of the glass sheet 22, as at 18, 19, 18', 19'. These beams support the bands 7, 8, 9, 10, 11, 12 etc., which make actual contact with strips of the glass. These bands need not be continuous, but may be severally spaced apart sufficiently to provide for the tongs and the articulations. They may be of any shape which is desired in the final article, and are adjustably mounted on the beams. As shown in FIG. 3, the band 10 is mounted by adjustable post 17 on beam 15'. The band 10 is composed of rubber fixed on spring steel 23 which can be bent by means of three threaded rods 17. Likewise, the bands 7, 11, etc., are flexible and adjustably mounted for example by threaded rod 25 so that in the pressing operation they act uniformly against the surface of the glass. By this construction a single frame may be adapted to a plurality of forms by bringing the frame against the forms and adjusting the position of the bands until perfect conformity is achieved. As shown in these figures, the bands 7, 8, 9, etc., of the central section have been adjusted until they are aligned with the curvature of the central part of form 1. The bands 10, 10' of sections 15, 15' are highly curved to conform to the conic section desired in the final article and are not initially in contact with the glass sheet, whereas the bands 7, 8 and 9 make contact with the sheet in the first instance. The bands may have curved ends, as shown at 11 in FIG. 3, where desirable. They may be covered with fiber glass to protect them from the hot glass and to prevent adhesion. The glass is pushed against the face of form 1 at its central part by means of a shaft 28 acting on the central portion 8 of the frame, which bends the central section of the glass to the shape of the face of form 1. Thereafter, pneumatic plungers 33, 33', which are attached by ball-thrust bearings to extensions 30, 30' on the end sections 16', 16 of the frame, urge the articulated sections 15, 16, 15', 16' toward the form, carrying the ends of the glass sheet into contact with the face of the form. It is desirable that the pressing of the glass should proceed progressively from the center to the ends, and in order to accomplish this, springs 27, 27' are provided between sections 15, 16 and 15', 16' respectively. These springs are provided with a strength greater than the resistance of the glass being bent, so that the thrust of the plungers 33, 33' first bends the glass about the axes Y-Y', and thereafter about axes X-X'. During the first stage of the bending about axes Y-Y', the band 10 is not necessarily in contact with the glass, but comes in contact with it as the bending proceeds and as it nears the face 3, 3' of the form 1. In order to keep the frame extended and to assist the springs 27, 27' in maintaining outward progression of pressing from the center weights 29, 29' are connected over pulleys 31, 32, 31', 32' to the ends 30, 30' of the frame.

The left half of FIG. 1 shows the glass and frame in place just prior to pressing. The right half of FIG. 1 shows the glass and frame in place after completion of the pressing.

The weights 29, 29' also serve to return the wings of the frame to extended position after each pressing.

A preferred method of making flexible strips such as strip 10, which are to receive curvatures of short radius, is to mount a block of rubber 23' on a strip of spring steel of no great thickness, the surface of the rubber being covered with fiber glass fabric 24, to protect it from the hot glass, which may be applied to the entire strip like a glove. The plungers 33, 33' are pivotally mounted at the points of support and at their points of attachment to the frame, so that they may align themselves perfectly at all times regardless of the position of the terminals of the frame.

A modification of the invention is shown in FIG. 4 wherein the pivots which articulate the frame are freely mounted in that section which is to be fixed during the pivoting of the other, and are fixed to the other. Thus, the pivot 19' is free to rotate in frame members 14, but is fixed to a member 54. The pivot is extended at 53 and receives a pinion 34 keyed thereon, with which a rack 35 is engaged. The member 54 supports the elements 15' which engage the suspended glass, so that the operation of the rack in the direction of the arrow will force the elements 15' against the glass and the glass against the form 1 to bend it. The member 54 is fixed by 55 to an element 56 keyed on a shaft 57 constituting the articulation 21'. The pinion 34' is keyed on the shaft 58 pivoting into the member 54 and keyed on the support 16'. This shaft constitutes the articulation 18', the articulation 20' being constituted by a shaft 59 keyed on the support 16' and pivoting into the element 56. When the bending of the conic section has been completed, the rack and pinion 34', 35', of which 34' is freely rotatable in members 54 but fixed to frame member 16', are operated to complete the bending of the terminal sections of the glass.

FIG. 5 is an enlargement of the invention which illustrates that the form 1 as well as the frame may be movable to press the glass sheet 22 between them. The construction of form 1 is quite similar to that which has been heretofore described, but the construction of the frame and the method of operation are quite different. The frame is represented as having five sections 37, 38, 39, 38', 39' which are articulated at the upper part, at 19, 18, 19', 18' and at 20, 21, 20', 21' at the lower part, respectively. Between each section of the frame are bellows 40, 41, 40', 41' which are supplied with air from hoses 42, 42', 43, 43'. Valves 44, 44' as shown in FIG. 6, control the flow of pressure through the bellows 40, 41 and release valves 45—45' are provided for releasing the pressure. Springs 46, 47, 46', 47' placed between two contiguous sections preferably at points distant from the pivoting joints normally keep the frame in extended position. Organs, such as rods, are associated to the springs for limiting the travels of the sections during the pressing. When air is admitted to hoses 42, 42', the bellows 40, 40' are extended, causing the sections 38, 38' by pivoting around the articulations 19, 19' to bend the glass which is located adjacent thereto. When the articulations 18, 18' come into contact with abutments 5 the air pressure opens the valves 44, 44' with calibrated springs 60 admitting air to the bellows 41, 41'. These bellows are extended, forcing the terminal portions of the glass against the ends of form 1 and completing the bending. Abutments 5 are engaged by the pivots 18' and prevent damage to the glass by the application of too much pressure. After the pressing is completed, the air in hoses 42, 42' is turned off and release valves 45, 45' are operated, whereupon the springs 46, 47, 46', 47' return the frame to the position shown at the right of FIG. 5.

In FIG. 6 there is shown a suitable valve of known type. It can be assumed that the pressure is delivered from the right against the face of the plunger of valve element 44 and the spring 60 will have sufficient power to prevent displacement of the valve element 44. When it is desired to admit pressure to the hose 43, the operator can pull the knob 61, this therefore combining with the gas pressure to overcome the force of spring 60 and to admit pressure to hose 43. But with a valve provided with calibrated spring the operation will be automatic.

The apparatus functions as follows, all the forms of the apparatus having functions in common. The glass sheet which has been heated to the bending temperature of the glass, is vertically suspended by tongs 50 between the rigid convex form 1 and the extended frame which is located in a plane parallel to the glass sheet. The midportion of the frame is then pressed, in the direction indicated by arrow f', by shaft 28 against the edges of the sheets which are thus bent to the cylindrical shape of the face of form 1. The pressure applied by the frame may be generated in different ways, but so that it is always the intermediate elements of the frame, those which are adjacent to the mid-section, which next press the glass sheet against the form. The pressing then continues, element by element, toward the terminal sections of the glass. It is to be understood that, while the illustrated embodiment includes five sections, the principles of the invention contemplate a lesser or greater number of sections.

In the first method of execution, the hydraulic pistons push the extremities of the frame toward the convex form 1, the sections 15, 16, for example, pivoting together about the axes Y—Y'. This pivoting of the entire wing is made possible because the springs 27 have a greater resistance to elongation than has the glass to deformation. The articulation 18 engages the abutments 5 on form 1. The effort of the pistons continues, thus producing an elongation of springs 27, and section 16 pivots around articulation 18 until the frame has applied the glass sheet to the extremities of form 1. When the bending has been completed the pressure in the pistons is released and the weights return the wings of the frame to extended position.

In the first modification, FIG. 4, the element of the frame adjacent to the mid-section is pivoted about axes Y—Y' by rotating the shafts 53, 57 by means of rack 35 and pinion 34 until the bands have applied the glass sheet to the rigid form. Then, in the same way, the extreme elements of the frames are pivoted about axes X—X'.

In the second modification, FIG. 5, the bellows 40, 40' are connected to a reservoir of air under pressure by means of suitable valves, not shown. The admission of pressure to the bellows produces the pivoting of sections 38, 38' about pivots 19, 19' until the pivots 18, 18' make contact with abutment 5. If valves of proper strong pressure have been selected, it will be unnecessary for the operator to work valves 44, 44' by hand, but the building up of pressure will overcome the force of spring 60 and admit air to bellows 41, 41'. The glass sheet having been bent, the air is turned off in lines 42, 42', the bellows and lines are released by valves 45, 45' and the springs 46, 47, 46', 47' return the sections of the frame to extended position.

The apparatus of the invention is not limited to the production of sheets possessing curvatures about a rectilineal axis, as has been described for windshields having cylindrical, conic and flat sections, but may be applied to sheets which include a slight curvature about another axis. The fabrication of a windshield having such a double curvature may be accomplished by the apparatus of the invention by using a rigid form having the desired curvature against which the glass is to be pressed, and by pressing the glass against the form by means of an articulated frame, the parts of which turn about articulations which are located in the prolongation of the lines of separation between sections, or which are approximately tangent to those lines at their extremities.

In another form of the invention, shown in FIG. 7, the element 55 is made of two parts and is articulated about an axis Z—Z' by means of levers, not shown. It is thus possible to give to the two parts constituing the element 55 a slight angle, in order to curve the axis X—X' and Y—Y' so that the articulated frame accurately presses the glass sheet onto the rigid curved form in a manner not heretofore developable. If the angle of rotation round axis Z—Z' is slight, a few degrees for example, it is not necessary to articulate the support 16, its own elasticity being sufficient to assume the necessary deformation.

In another form of the invention illustrated in FIGURE 7, a frame member 61 is pivotally mounted on the upper edge of the frame member 14, being articulated about an axis V—V' normal to the axis Y—Y' and pushed by levers, not shown, to bend the upper part of the glass sheet onto the rigid form. This embodiment is particularly interesting for the production of windshields incurved at their upper part to enable one to see the sky.

The apparatus of the invention is applicable to the bending of a plurality of sheets in a single operation. Such sheets can be suspended together from the same tongs and bent simultaneously. This makes a satisfactory apparatus for the preparing of glass for the manufacture of laminated articles such as laminated safety glass.

The apparatus is also applicable to thermoplastics and organic plastics which are in sheet form and have been brought to bending temperature before pressing by the apparatus and process of this invention.

After bending, the hot glass or hot organic plastic can be subjected to any desirable process, such as for instance the tempering of the glass sheets.

Among the advantages of the invention are the production of bent glass plates having sections of different curvature which are relatively free of distortion in the area of greatest curvature.

Another advantage arises from the manufacture of a panoramic windshield by the interposition of a conic section between other sections which can share a generatrix in common. The progressive action of bending, applied to sections separated by a common generatrix, and proceeding section by section, is also advantageous.

Further, the apparatus allows the bending of glass sheet with a great accuracy and to obtain series of windshields of strictly identical curved non-developable form and consequently interchangeable. Moreover, by modification of the angles of the elements of the articulated frame, a plurality of forms according to the shape of the rigid form may be obtained.

As many apparently widely different embodiments of the present invention may be made without departing from the spirit and scope thereof, it is to be understood that the invention is not limited to the specific embodiments.

What is claimed is:

1. Apparatus for bending glass and the like comprising a form having a face including a plurality of geometric shapes, against which the glass is adapted to be pressed, means to support a hot glass sheet adjacent the form, means to press the sheet against the form comprising a frame including a plurality of pivoted sections having flexible bands mounted thereon adapted to engage the glass and force it against said form, means to adjust the contours of the bands relative to the sections, pivot means connecting a plurality of said sections together along the line of a common generatrix, means to press one of said sections against a part of said hot sheet whereby to conform the part to the shape of the form, and means to press an adjacent section of the frame against another part of the glass whereby to force it into shaping contact with said form.

2. Apparatus for bending glass and the like comprising a vertically arranged form, having a face including a plurality of geometric shapes, against which the glass is adapted to be pressed, means to support a hot glass sheet vertically before the form, means to press the sheet against the form comprising a frame including a central section having pressure bands conforming to one of the shapes of the form, wing sections pivoted thereto having pressure bands conforming to adjacent shapes of the form, and terminal sections having pressure bands conforming to other shapes of the form, said pressure bands being flexible, means to adjust the contours of the bands relative to the sections, pivot means connecting said sections together along the lines of common generatrix, means to press the central section against a part of said hot sheet whereby to conform said part to the shape of the form, and means to press the wing and terminal sections of the frame in sequence against adjacent parts of the glass sheet whereby to conform the sheet to other shapes of said form.

3. Apparatus for bending glass and the like comprising a vertically arranged form, having a face including a plurality of geometric shapes, against which the glass is adapted to be pressed, means to support a hot glass sheet vertically before the form, means to press the sheet against the form comprising a frame including a central section having pressure bands conforming to one of the shapes of the form, wing sections pivoted thereto having pressure bands conforming to adjacent shapes of the form, and terminal sections having pressure bands conforming to other shapes of the form, pivot means connecting said sections together along the lines of common generatrix, means to press the central section against a part of said hot sheet whereby to conform said part to the shape of the form, and means to press the wing and terminal sections of the frame against adjacent parts of the glass sheet whereby to conform the sheet to other shapes of said form, said means for pressing the wing and terminal sections comprising gear means pivotally connecting sections of the frame together on an axis aligned with a common generatrix, and means to rotate the gear means.

4. Apparatus for bending glass and the like comprising a vertically arranged form, having a face including a plurality of geometric shapes, against which the glass is adapted to be pressed, means to support a hot glass sheet vertically before the form, means to press the sheet against the form comprising a frame including a central section having pressure bands conforming to one of the shapes of the form, wing sections pivoted thereto having pressure bands conforming to adjacent shapes of the form, and terminal sections having pressure bands conforming to other shapes of the form, pivot means connecting said sections together along the lines of common generatrix, means to press the central section against a part of said hot sheet whereby to conform said part to the shape of the form, and means to press the wing and terminal sections of the frame against adjacent parts of the glass sheet whereby to conform the sheet to other shapes of said form, said means to press the wing and terminal sections comprising bellows interposed therebetween, and means to operate the bellows.

5. Apparatus for bending glass and the like comprising a form having a face including a plurality of geometric shapes, against which the glass is adapted to be pressed, means to support a hot glass sheet adjacent the form, means to press the sheet against the form comprising a frame including a plurality of pivoted sections having bands mounted thereon adapted to engage the glass and force it against said form, pivot means connecting a plurality of said sections together along the line of a common generatrix, said pivot means pivotally connecting adjacent sections together about an axis which coincides with the common generatrix between the glass-engaging surfaces of said bands on said sections, means to press one of said sections against a part of said hot sheet whereby to conform the part to the shape of the form, and means to press an adjacent section of the frame against another part of the glass whereby to force it into shaping contact with said form.

6. Apparatus according to claim 5 including spring means connected between adjacent sections to resist pivotal movement of one of the sections relative to the other until the other has been pressed against a part of said hot sheet to conform that part to the shape of said form.

References Cited by the Examiner

UNITED STATES PATENTS

| 2,736,140 | 2/1956 | Black | 65—291 |
| 3,077,753 | 2/1963 | Dammers | 65—106 |

DONALL H. SYLVESTER, *Primary Examiner.*